United States Patent [19]

Beam

[11] Patent Number: 5,022,608
[45] Date of Patent: Jun. 11, 1991

[54] LIGHTWEIGHT MISSILE GUIDANCE SYSTEM

[75] Inventor: Norman E. Beam, Charlottesville, Va.

[73] Assignee: Hughes Aircraft Company, Los Angeles, Calif.

[21] Appl. No.: 462,181

[22] Filed: Jan. 8, 1990

[51] Int. Cl.[5] ............................................. F41G 7/36
[52] U.S. Cl. ................................................. 244/3.18
[58] Field of Search ............................ 244/3.18, 3.17; 250/203 R

[56] References Cited

U.S. PATENT DOCUMENTS 3,025,023 3/1962 Barghausen ........................ 244/3.18

Primary Examiner—Charles T. Jordan
Attorney, Agent, or Firm—C. D. Brown; R. M. Heald; W. K. Denson-Low

[57] ABSTRACT

A lightweight missile terminal guidance system 14 is disclosed which includes a seeker 16 for providing a first signal indicative of a first angle $\epsilon$ between a line-of-sight 15 from the missile 10 to a target 12 and a longitudinal axis 9 extending through the missile 10. The seeker 16 also provides a second signal indicative of a second angle $\delta$ between the longitudinal axis 9 extending through the missile 10 and a line-of-sight 11 between the missile 10 and a celestial body 13. A processor 18 is included for computing the line-of-sight angle $\sigma$ between the line-of-sight 15 from the missile 10 to the target 12 and the line-of-sight 11 from the missile 10 to the celestial body 13 from the first and second angles $\epsilon$ and $\delta$. A terminal guidance subsystem 24 computes acceleration commands from the line-of-sight $\sigma$ angle which are used by a propulsion system 26 to change the velocity vector of the missile 10 in response thereto.

10 Claims, 2 Drawing Sheets

LIGHTWEIGHT MISSILE GUIDANCE SYSTEM

This invention was made with Government support under Contract No. DAAA21-85-C-0291 awarded by the Department of the Army. The Government has certain rights in this invention.

BACKGROUND OF THE INVENTION

1. Field of the Invention

The present invention relates to missile guidance systems. More specifically, the present invention relates to guidance systems for lightweight kinetic kill vehicles. While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Recent tactical assessments have required an upgrade in the considerable inherent threat potential of a satellite. As a result, numerous proposals have been considered to address the satellite threat. One such proposal involves the use of kinetic kill vehicles (KKVs) to provide an antisatellite capability. A kinetic kill vehicle is a lightweight vehicle weighing 40 to 300 pounds. These devices are designed for exo-atmospheric operation and have onboard propulsion and guidance systems. The propulsion system accelerates the vehicle to velocities in the range of 2 to 20 kilometers per second. Hence, kinetic kill vehicles differ from conventional missiles in that KKVs are not equipped with a warhead. Instead, the destructive capability of the vehicle is provided by the delivery to a target of a considerable load of kinetic energy. Obviously, effective operation for a given mission would require a system capable of providing accurate guidance, measured with respect to a 'miss distance', on the order of $\pm \frac{1}{2}$ meter.

The guidance technology heretofore considered for kinetic kill vehicles involves the use of an infrared seeker with a ring laser gyroscope type inertial measurement unit. This approach envisions the use of a conventional proportional navigation scheme. While this approach appears feasible for large KKVs, it is believed to have certain limitations with respect thereto. First is the question of cost. Ring laser gyros are expensive and delicate devices. The use of ring laser gyros in inertial measurements units in KKVs (i.e., "smart rocks") would substantially drive up the cost of implementing the KKV answer to the satellite threat.

Further, and perhaps more significantly, there is an ongoing effort to demonstrate the feasibility of a further reduction in the size and weight of KKVs by at least one order of magnitude. These devices are envisioned as being on the order of 4-10 pounds in weight. A significant reduction in the weight of each KKV would significantly reduce the cost of placing these devices in orbit. To achieve mission objectives, that is, to provide guidance for the KKV to the above-noted degree of accuracy, with a ring laser gyro, would be somewhat problematic. The current state of the art in ring laser gyro fabrication is such that it does not appear to be possible presently to fabricate IMUs small enough to permit the desired reduction in size and weight.

Thus, there is a need in the art for a lightweight inexpensive guidance system for a 4-10 pound KKVs capable of providing miss distance accuracy on the order of $\pm \frac{1}{2}$ meter at speeds in the range of 2 to 20 kilometers per second.

SUMMARY OF THE INVENTION

The need in the art is addressed by the lightweight missile terminal guidance system of the present invention. The present guidance system includes a seeker for providing a first signal indicative of a first angle between a line-of-sight from the missile to a target and a longitudinal axis extending through the missile. The seeker also provides a second signal indicative of a second angle between the longitudinal axis extending through the missile and a line-of-sight between the missile and a celestial body. A processor is included for computing the line-of-sight angle between the line-of-sight from the missile to the target and the line-of-sight from the missile to the celestial body from the first and second angles. A terminal guidance subsystem computes acceleration commands for target intercept from the line-of-sight angle which are used by a propulsion system to change the velocity vector of the missile in response thereto.

The system of the present invention provides proportional astrogation, that is, terminal guidance without gyroscopes or conventional inertial measurement units. Hence, the terminal guidance system of the present provides a small, highly accurate, low cost, lightweight alternative to conventional terminal guidance techniques.

DESCRIPTION OF THE INVENTION

Illustrative embodiments and exemplary applications will now be described with reference to the accompanying drawings to disclose the advantageous teachings of the present invention.

Proportional navigation with a body fixed seeker depends on measuring line-of-sight angles by combining body angles and tracking error angles. The present invention provides a novel terminal guidance system and method for interceptors in space. The present invention eliminates the need for gyros when using a seeker which can track stars concurrrently with targets. The method of the invention (called 'proportional astrogation') uses fixed stars to supply the inertial reference necessary for terminal guidance.

Recent research has shown that it is practical to intercept targets in space at extremely high closing velocities (10 to 20 kilometers per second) using relatively small and inexpensive kinetic kill vehicles. These vehicles destroy their targets without warheads by simply colliding with the targets at high speed. Hit-to-kill performance requires very accurate terminal guidance for which the driving factors are seeker and gyro accuracy. For the lightweight interceptors recently under consideration, performance is determined by the limited accuracy of lightweight gyros. Proportional astrogation avoids the need for gyros by using an imaging sensor (seeker) to measure inertial line-of-sight rates. By removing the gyros, it is possible to significantly reduce total missile cost and mass, thereby alleviating the high costs of orbital launch.

Figure 1:
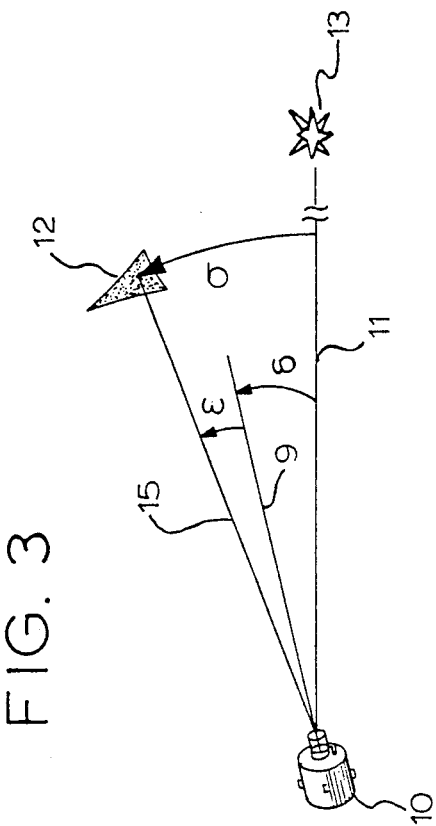
FIG. 1 is an diagram illustrative of the conventional terminal guidance technique of proportional navigation.

FIG. 1 is an illustrative diagram of the conventional terminal guidance technique of proportional navigation. Proportional navigation (and it's many variants) works by measuring the missile to target line-of-sight angles and the time derivatives thereof. Several designs of space interceptors use body fixed, infrared imaging sensors to measure the line-of-sight angle ($\epsilon$) from the missile 10' to the target 12' off the longitudinal axis of the missile (boresight) 9'. The attitude ($\Theta$) of the missile 10' with respect to inertial space is determined by using a gyro based attitude reference system. As shown in FIG. 1, these angles are combined to determine the line-of-sight angle ($\sigma$). The line-of-sight angle can be defined with respect to any arbitrary inertial frame. Various guidance schemes filter or differentiate the line-of-sight angles to determine how the line-of-sight is rotating ($\sigma'$). The missile guidance law uses these line-of-sight rates to determine the missile acceleration pg,7 commands which eventually bring the missile to an impact with the target. Proportional navigation calculates the missile's acceleration necessary to do this. In the case of a nonaccelerating target, the equation can be expressed as:

$$A_{cmd} = \Lambda V_c \sigma' \text{ (meters/second}^2) \quad [1]$$

where:
$A_{cmd}$ = the missile acceleration command perpendicular to the line-of-sight,
$\Lambda$ = navigational gain,
$V_c$ = missile to target closing velocity, and
$\sigma'$ = missile to target inertial line-of-sight rate.

Figure 2:
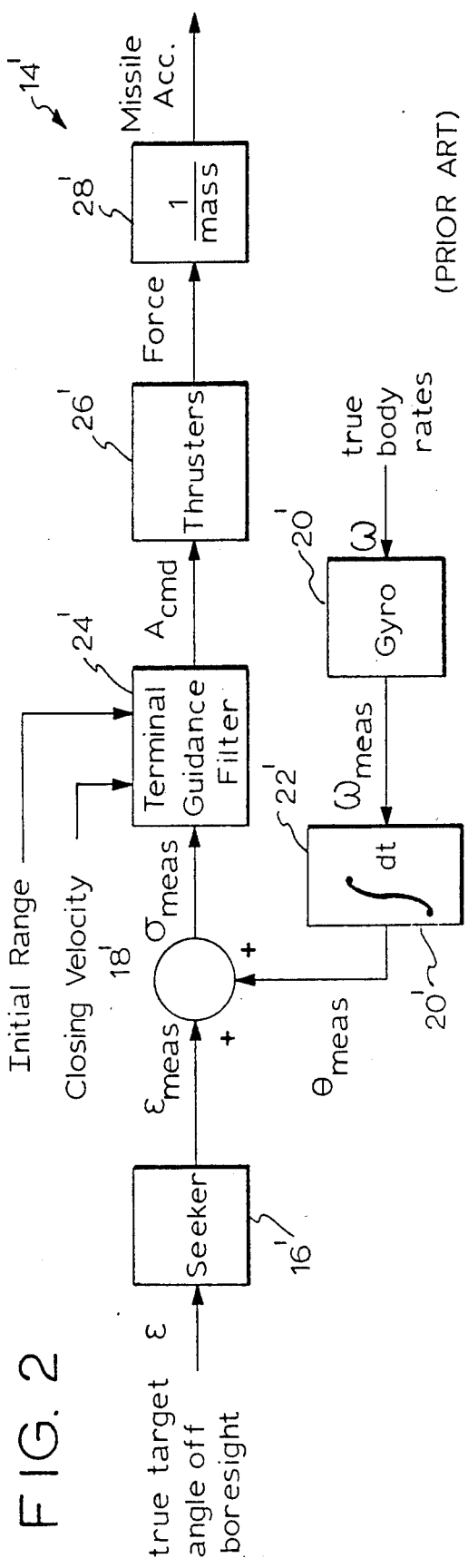
FIG. 2 is an illustrative block diagram of a conventional terminal guidance system.

FIG. 2 is an illustrative block diagram of a terminal guidance system 14' for the conventional body fixed interceptor missile 10'. The system 14' includes a seeker 16'. The seeker 16' is typically an infrared seeker which receives energy from the target 12' which represents the true target angle $\epsilon$ off boresight. The seeker includes a processor (not shown) which calculates a signal $\epsilon_{meas}$ which represents the sensed target angle off boresight complete with measured noise. The output of the seeker 16' is summed by a summer 18' with the output of a gyro 20' through an attitude reference system 22'. The angular velocity $\omega$ sensed by the gyro 20' $\omega_{meas}$ is integrated by the attitude reference system 22' to calculate the sensed body orientation $\Theta_{meas}$. Hence, the measurements from the seeker 16' are combined with the sensed body orientation $\Theta_{meas}$ by the summer 18' to produce the target line-of-sight measurement $\sigma_{meas}$. (In actuality, the summing operation is performed by the seeker processor (not shown).)

A terminal guidance filter 24' factors in the initial range and closing velocity to calculate acceleration commands $A_{cmd}$ for a set of thrusters 26' which act through the missile center of mass 28' to produce changes in the velocity vector of the missile 10' necessary to hit the target 12'

Experience has shown that if gyro errors (i.e., rate noise, scale factor errors, misalignments etc.) dominate the noise on $\sigma_{meas}$, little can be done to improve system performance with filtering methods. This may force certain compromises on the system designer.

Figure 3:
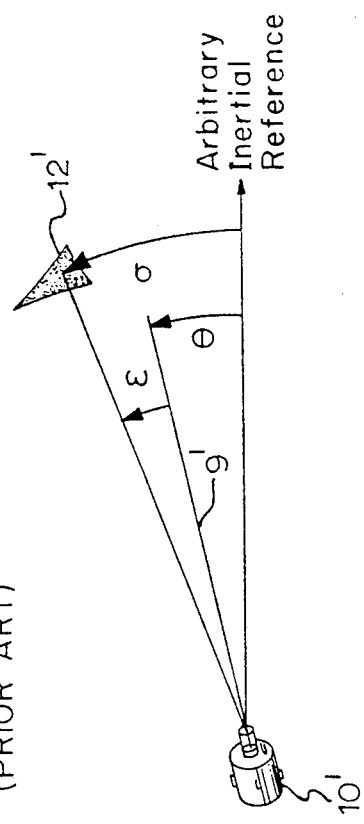
FIG. 3 is a concept illustrating the proportional astrogation technique of the present invention.

FIG. 3 is a diagram illustrating the proportional astrogation concept of the present invention. For the purpose of the present invention, the line-of-sight 11 from the missile 10 to a star (or other celestial body) 13 is essentially inertially stabilized (does not rotate). If a seeker is able to see some stars, the seeker could supply the inertial reference otherwise provided by gyros in conventional systems. In a mission where the target 12 is illuminated by the sun, a visible imaging sensor could supply a star based inertial reference and track a target at the same time. The line-of-sight angle o between the line-of-sight 11 to the star 13 and the line-of-sight 15 to the target 12 could be measured by the tracker Without referring to the gyro outputs. An added bonus would be that the effect of mismatches between the gyro and the seeker on guidance would be minimized. That is, temporal matching and scale factor problems are mitigated when guidance no longer depends on gyro data. While gyros might still be needed for attitude control feedback and roll orientation, these devices would not be needed for terminal guidance.

Figures 4, 5:
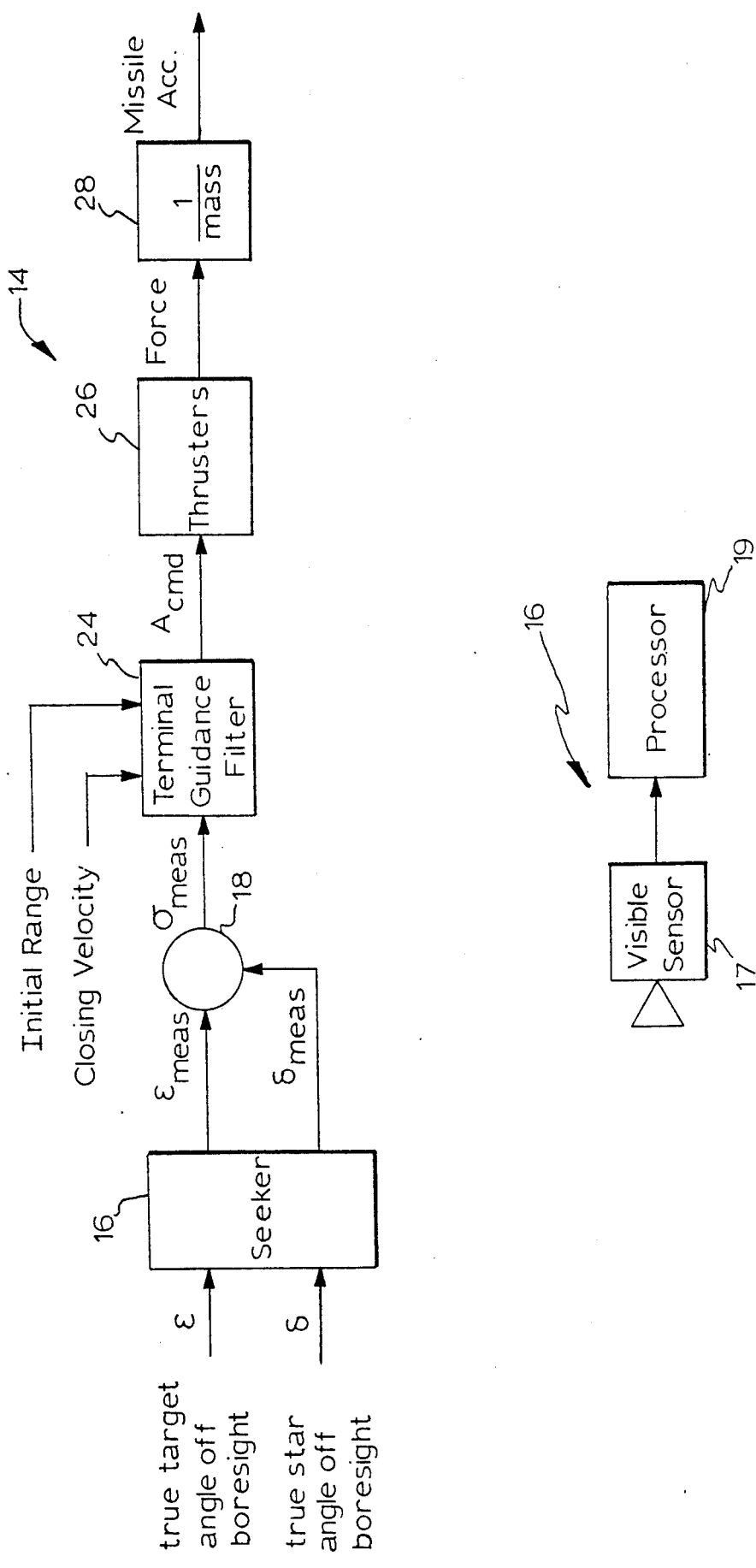
FIG. 4 is an illustrative block diagram of a terminal guidance system 14 made possible by the teachings of the present invention.
FIG. 5 shows a block diagram of an illustrative implementation of the seeker 16.

FIG. 4 is an illustrative block diagram of a terminal guidance system 14 made possible by the teachings of the present invention.

The seeker 16 must be capable of accurately resolving stars and targets and is, therefore, in the preferred embodiment, a visible or ultraviolet sensor. As shown in FIG. 5, the seeker 16 and summer 18 could be implemented with a large aperture visible sensor 17 and a processor 19. The seeker 16 processes multiple frames of data comprising the true target line-of-sight angle $\epsilon$ off boresight 9 and the true star line-of-angle angle $\delta$ off boresight 9 in order discriminate between the target and the stars and calculate the line-of-sight angle $\sigma$. This is accomplished using conventional image processing techniques implemented in software in the seeker processor 19. In the preferred embodiment, the processor 19 also includes software for identifying and gating the target and the stars in accordance with conventional algorithms. In the alternative, a star map may be used for this purpose without departing from the true spirit and scope of the present invention. In any event, the target gate and the star gate are tracked simultaneously and independently.

In accordance with the present teachings, data from a single star is processed in a conventional manner to provide missile pitch and yaw information. Thus, each star provides two line-of-sight angles $\delta$. This provides two dimensions of the line-of-sight angle $\sigma$. The third dimension of the line-of-sight angle $\sigma$ is provided by pitch and yaw data extracted from the target line-of-sight angles $\epsilon$ off boresight 9. Data from two stars is processed in a conventional manner to provide missile roll orientation. If several stars are tracked simultaneously, an improved inertial reference can be calculated by averaging the angular positions of same. The angular uncertainty in the reference would then vary as $\sqrt{n^{-1}}$, where n is the number of stars being tracked.

Thus, the measured line-of-sight angle $\sigma_{meas}$ is provided to the terminal guidance filter 24 and processed in a conventional manner to provide acceleration commands for the thrusters 26 of the missile as discussed above.

The likelihood of stars being seen by the missile is a function of seeker sensitivity. Human beings can see stars as dim as sixth magnitude. Unfortunately, there are less than five thousand stars across the celestial sphere that are this bright. The odds of one being in the field of view of a seeker with a narrow field of view (e.g. 1°×1°) are small. A typical seeker might have an aperture of 20 centimeters, giving it several hundred times the light collecting capability of the human eye. Therefore, a missile seeker operating in the visible spectrum could reasonable be expected to see ninth or tenth magnitude stars. There are roughly 324,000 stars of tenth magnitude or brighter according to the "Handbook of Optics", by Walter G. Driscoll, and William Vaughan (ed.), McGraw-Hill, New York, p. 3–70 (1978). Therefore, even a narrow field-of-view seeker (1°×1°) would normally have several tenth magnitude stars in its field-of-view. There are areas in the sky that have few stars compared to the average. If this is a problem, trajectory shaping can be used to ensure that there are adequate stars in the field-of-view to practice the present invention.

During a long engagement outside the atmosphere, the line-of-sight could rotate significantly, the seeker would rotate to keep the target in the field-of-view at all times. This could cause the stars that are being tracked to pass out of the field-of-view. As all stars are equally good inertial references, this presents no problem so long as another star is already being tracked. In this way, the line-of-sight could rotate significantly, while the inertial reference is passed from star to star. This indicates that an elaborate star may not be necessary. The tracker only needs to decide that an object is a star, to use it as an inertial reference.

The seeker must be able to acquire the target against a star background and then supply continuous angular updates almost until impact. At acquisition, the target appears in the field-of-view along with several stars. The target could be distinguished from these stars by a number of methods. Fire control could supply a map of the target's expected position against the stars that are visible to the seeker. Such a map would allow the missile to find the target by assuming that the target was the object that did not correspond to the know stars. Also, relative motion and intensity growth could be used as ways of determining which object is the target. Once the target is determined, all other objects are assumed to be stars. The more stars tracked, the better the inertial reference supplied for guidance.

With such an accurate star based inertial map, it may be possible to eliminate gyros entirely. A visible waveband seeker could be used to monitor the star map and provide orientation information by continuously tracking known star locations during midcourse guidance. If seeker frame rates are high enough, star track angular information can also be used to provide rate feedback to the attitude control system. If the seeker is pointed along the missile's roll axis, the measured angular rates of the fixed stars in the field-of-view δ′ correspond to the missile's yaw and pitch rates. If the seeker's field-of-view is large enough, it becomes possible to sense roll orientation and roll rates by watching stars near the edge of the field of view rotate about the center of the field-of-view.

The quality of the body rate from the seeker depends on several factors. If no filtering is performed, the rates can be calculated by simple numerical differentiation. This would result in white rate noise out from DC to half the seeker frame rate. Assume that the seeker updates at a frame rate of f hertz and the accuracy of any one sample of $\delta_{meas}$ is given by $\sigma\delta$. The single sided power spectral density PSD can be calculated simply for the pitch and yaw body rates:

$$PSD_{yaw\&pitch} = (2\sigma\delta/f)(2/n)^{\frac{1}{2}} \quad [2]$$

in units of (radians/second)²/hertz, where n is the number of stars tracked.

The roll rate measurement is more difficult to quantify since this depends on the availability of stars near the edge of the field-of-view. As more stars are visible in the field-of-view, it becomes more likely that some will be near the edge of the field of view. Assuming that there are usually stars visible on opposite sides of the field-of-view, then the power spectral density of the roll channel rate noise is simple to calculate as a function of the field-of-view (FOV).

$$PSD_{Roll} = \sin(FOV)2\sigma\delta 2^{\frac{1}{2}}/f \quad [3]$$

in units of (radians/second)²/hertz.

This is, of course, a simplified calculation. It ignores the possibility of there being no stars near the edge of the field-of-view when there are few stars in the field-of-view.

Proportional astrogation substantially eliminates one of the major sources of miss distance in exo-atmospheric interceptors. In a conventional guidance system, the body attitude is calculated from gyro data. The random walk of the body attitude can be a limiting factor in guidance. For example, Kalman guidance filters are good at rejecting uncorrelated noise. However, a guidance filter may see the effect of random walk on the line-of-sight measurement as a correlated signal from update to update and will assume that it represents a signal rather than noise. Proportional astrogation's line-of-sight references are subject to band limited noise, but they can not drift. There is no random walk phenomenon associated with proportional astrogation.

Thus, the present invention has been described herein with reference to a particular embodiment for a particular application. Those having ordinary skill in the art and access to the present teachings will recognize additional modifications, applications and embodiments within the scope thereof. For example, the star tracking and target tracking do not have to be performed by the same hardware. For example, if the seeker was in the mid-wave infrared region, there are few bright stars. A 20 centimeter seeker might only be able to find a dozen or two stars across the entire sky. In this case, a visible camera added to do just the star tracking could augment the infrared seeker and still allow proportional astrogation to be performed. The need for an additional seeker in this case could be an advantage because it would then provide the tracker with the ability to perform multi-spectral target discrimination. Further, the system may be designed to acquire an inertial reference from other celestial or man-made bodies without departing from the scope of the present teachings.

It is therefore intended by the appended claims to cover any and all such applications, modifications and embodiments within the scope of the present invention.

Accordingly,

What is claimed is:

1. A lightweight missile terminal guidance system comprising:
   seeker means for providing a first signal indicative of a first angle between a line-of-sight from said missile to a target and a longitudinal axis extending through said missile and for providing a second signal indicative of a second angle between said longitudinal axis extending through said missile and a line-of-sight between said missile and a celestial body;

processing means for computing the line-of-sight angle between the line-of-sight from the missile to the target and the line-of-sight from the missile to the celestial body from said first and second angles;

terminal guidance means for computing and providing acceleration commands from said line-of-sight angle; and propulsion means for changing a velocity vector of said missile in response to said acceleration commands.

2. The invention of claim 1 wherein said seeker means includes a visible seeker.

3. The invention of claim 1 wherein said seeker means includes an ultraviolet seeker.

4. The invention of claim 1 wherein said processor means includes means for discriminating between said first and second signals.

5. The invention of claim 4 wherein said processor means includes means for tracking said target and identifying said first signal.

6. The invention of claim 5 wherein said processor means includes means for tracking said celestial body and identifying said second signal.

7. A lightweight missile comprising:

seeker means including a visible seeker for providing a first signal indicative of a first angle between a line-of-sight from said missile to a target and a longitudinal axis extending through said missile and for providing a second signal indicative of a second angle between said longitudinal axis extending through said missile and a line-of-sight between said missile and a celestial body;

processing means for computing the line-of-sight angle between the line-of-sight from the missile to the target and the line-of-sight from the missile to the celestial body from said first and second angles, said processor means including means for discriminating between said first and second signals, said means for discriminating including means for tracking said target and identifying said first signal and means for tracking said celestial body and identifying said second signal;

terminal guidance means for computing and providing acceleration commands from said line-of-sight angle; and propulsion means for changing a velocity vector of said missile in response to said acceleration commands.

8. A method for providing terminal guidance for a lightweight missile including the steps of:

a) providing a first signal indicative of a first angle between a line-of-sight from said missile to a target and a longitudinal axis extending through said missile and for providing a second signal indicative of a second angle between said longitudinal axis extending through said missile and a line-of-sight between said missile and a celestial body;

b) computing the line-of-sight angle between the line-of-sight from the missile to the target and the line-of-sight from the missile to the celestial body from said first and second angles;

c) computing and providing acceleration commands from said line-of-sight angle; and d) changing a velocity vector of said missile in response to said acceleration commands.

9. The invention of claim 8 wherein the step a) includes the step of tracking several celestial bodies simultaneously to provide plural signals indicative of plural angles between said longitudinal axis extending through said missile and a line-of-sight between said missile and said celestial bodies.

10. The invention of claim 9 wherein the step a) includes the step of averaging the plural angles to compute said second angle.

* * * * *

UNITED STATES PATENT AND TRADEMARK OFFICE
CERTIFICATE OF CORRECTION

PATENT NO. : 5,022,608

DATED : June 11, 1991

INVENTOR(S) : Norman E. Beam and Leonard D. Vance

It is certified that error appears in the above-identified patent and that said Letters Patent is hereby corrected as shown below:

On the title page, under item [19], should read --Beam et al.--

On the title page, item [75] should read:

[75] Inventors: Norman E. Beam, Charlottesville, VA.
Leonard D. Vance, West Hills, CA.

Signed and Sealed this

Twentieth Day of October, 1992

Attest:

DOUGLAS B. COMER

Attesting Officer

Acting Commissioner of Patents and Trademarks